(12) United States Patent
Asada et al.

(10) Patent No.: US 11,506,774 B2
(45) Date of Patent: Nov. 22, 2022

(54) SUB-CARRIER MODULATED TERAHERTZ RADAR

(71) Applicant: TOKYO INSTITUTE OF TECHNOLOGY, Tokyo (JP)

(72) Inventors: Masahiro Asada, Tokyo (JP); Safumi Suzuki, Tokyo (JP); Adrian Dobroiu, Tokyo (JP)

(73) Assignee: TOKYO INSTITUTE OF TECHNOLOGY, Tokyo (JP)

( * ) Notice: Subject to any disclaimer, the term of this patent is extended or adjusted under 35 U.S.C. 154(b) by 212 days.

(21) Appl. No.: 17/128,633

(22) Filed: Dec. 21, 2020

(65) Prior Publication Data

US 2021/0190931 A1 Jun. 24, 2021

(30) Foreign Application Priority Data

Dec. 24, 2019 (JP) .............................. JP2019-232617

(51) Int. Cl.
*G01S 13/34* (2006.01)
*G01S 7/35* (2006.01)

(52) U.S. Cl.
CPC ............ *G01S 13/343* (2013.01); *G01S 7/352* (2013.01); *G01S 7/356* (2021.05)

(58) Field of Classification Search
CPC ......... G01S 13/343; G01S 7/352; G01S 7/356
USPC ....................................................... 342/128
See application file for complete search history.

(56) References Cited

U.S. PATENT DOCUMENTS

| 5,778,016 | A | * | 7/1998 | Sucha | G01S 17/18 |
| | | | | | 372/38.1 |
| 6,049,308 | A | * | 4/2000 | Hietala | B82Y 10/00 |
| | | | | | 343/700 MS |
| 7,085,637 | B2 | * | 8/2006 | Breed | G08G 1/163 |
| | | | | | 701/470 |
| 7,110,880 | B2 | * | 9/2006 | Breed | B60W 50/00 |
| | | | | | 340/995.13 |

(Continued)

FOREIGN PATENT DOCUMENTS

| CN | 109076478 A | * | 12/2018 | ......... H04J 11/0069 |
| CN | 109155728 A | * | 1/2019 | .......... H04B 7/0408 |

(Continued)

OTHER PUBLICATIONS

EP-3433968-A1, Cheng Q, Jan. 2019 (Year: 2019)—abstract and classification only.*

(Continued)

*Primary Examiner* — Bernarr E Gregory
*Assistant Examiner* — Nuzhat Pervin
(74) *Attorney, Agent, or Firm* — Wenderoth, Lind & Ponack, L.L.P.

(57) ABSTRACT

The present invention is the sub-carrier modulated terahertz radar that modulates a main-carrier signal in the terahertz frequency band, which is generated from a resonant tunneling diode (RTD), by a sub-carrier signal in a gigahertz frequency band whose frequency varies periodically, irradiates a frequency-modulated irradiation light to a target, detects and demodulates a reflected light from the target, mixes a demodulated signal with the sub-carrier signal, performs a Fourier transform on a mixed signal, and measures a distance from an irradiation position to the target by using a Fourier-transformed frequency signal.

11 Claims, 5 Drawing Sheets

(56) References Cited

U.S. PATENT DOCUMENTS

| | | | | |
|---|---|---|---|---|
| 7,202,776 | B2* | 4/2007 | Breed | G08G 1/161 340/557 |
| 7,418,346 | B2* | 8/2008 | Breed | G01S 19/17 701/117 |
| 7,683,325 | B2* | 3/2010 | Sekiguchi | G01V 8/005 250/339.08 |
| 7,990,283 | B2* | 8/2011 | Breed | G01S 19/42 340/995.13 |
| 8,129,684 | B2* | 3/2012 | Mueller | G01S 13/887 250/336.1 |
| 8,630,795 | B2* | 1/2014 | Breed | G01C 21/3697 701/1 |
| 8,797,208 | B2* | 8/2014 | Stirling-Gallacher | G01S 13/343 342/179 |
| 8,965,677 | B2* | 2/2015 | Breed | G01S 19/50 701/301 |
| 9,007,197 | B2* | 4/2015 | Breed | G01S 17/08 340/436 |
| 9,024,809 | B2* | 5/2015 | Testar | G01S 13/343 342/128 |
| 9,253,772 | B2* | 2/2016 | Fong | H04L 5/0053 |
| 9,817,121 | B2* | 11/2017 | Inoue | G01P 3/68 |
| 10,274,513 | B2* | 4/2019 | Friedman | G01Q 60/30 |
| 10,473,694 | B2* | 11/2019 | Friedman | G01Q 60/30 |
| 10,826,658 | B2* | 11/2020 | Fong | H04L 25/03866 |
| 11,266,839 | B1* | 3/2022 | John | A61N 1/36064 |
| 11,330,633 | B2* | 5/2022 | Jiang | H04W 74/0833 |
| 11,374,724 | B2* | 6/2022 | Feuersaenger | H04W 72/0453 |
| 2004/0155665 | A1* | 8/2004 | Arnone | G01N 21/3563 250/341.1 |
| 2005/0215031 | A1* | 9/2005 | Ouchi | G01J 3/0256 438/455 |
| 2005/0285541 | A1* | 12/2005 | LeChevalier | H01J 3/36 315/169.3 |
| 2009/0262764 | A1* | 10/2009 | Mattsson | G02F 1/365 438/31 |
| 2010/0033709 | A1* | 2/2010 | Lampin | G02F 1/3534 216/13 |
| 2010/0118292 | A1* | 5/2010 | Park | G01B 9/02028 356/482 |
| 2012/0044479 | A1* | 2/2012 | Roulston | G01J 3/4338 356/451 |
| 2015/0365611 | A1* | 12/2015 | Sekiguchi | H01L 27/14609 250/208.1 |
| 2017/0350964 | A1* | 12/2017 | Kaneda | G01S 17/26 |
| 2018/0217181 | A1* | 8/2018 | Friedman | G01Q 60/30 |
| 2018/0252581 | A1* | 9/2018 | Roulston | G01J 3/108 |
| 2019/0234993 | A1* | 8/2019 | Friedman | G01Q 60/30 |
| 2020/0400496 | A1* | 12/2020 | Roulston | G01N 21/3581 |
| 2021/0220455 | A1* | 7/2021 | Hacohen | A61K 39/0011 |
| 2021/0364353 | A1* | 11/2021 | Roulston | G01J 3/433 |

FOREIGN PATENT DOCUMENTS

| | | | | |
|---|---|---|---|---|
| EP | 3433968 | B1* | 4/2022 | H04L 27/261 |
| GB | 2359716 | A* | 8/2001 | G01N 21/3563 |
| JP | 2006-210585 | | 8/2006 | |
| JP | 4053542 | B2* | 2/2008 | G01S 17/32 |
| JP | 2013-171966 | | 9/2013 | |
| JP | 5970495 | B2* | 8/2016 | H04B 17/382 |
| WO | WO-2015001918 | A1* | 1/2015 | G01B 11/0608 |
| WO | 2015/170425 | | 11/2015 | |

OTHER PUBLICATIONS

Cooper, K.B., Dengler, R.J., Llombart, N., Thomas, B., Chattopadhyay, G., Siegel, P. H., "THz Imaging Radar for Standoff Personnel Screening", IEEE Trans. Terahertz Sci. Technol., vol. 1., No. 1, Sep. 2011, pp. 169-182.

Caris, M., Stanko, S., Wahlen, A., Sommer, R., Wilcke, J., Pohl, N., Leuther, A., Tessman, "Very High Resolution Radar at 300 GHz", Proceedings of the 11th European Microwave Conference, Rome, Italy, Oct. 8-10, 2014; pp. 494-496.

Jaeschke, T., Bredendiek, C., Pohl, N. "A 240 GHz Ultra-Wideband FMCW Radar System with On-Chip Antennas for High Resolution Radar Imaging", Proceedings of the 2013 IEEE MTT-S International Microwave Symposium Digest, Seattle, WA, USA, Jun. 2-7, 2013, pp. 1-4.

Izumi, R., Suzuki, S., Asada, M., "1.98 THz Resonant-Tunneling-Diode Oscillator with Reduced Conduction Loss by Thick Antenna Electrode", International Conference on Infrared, Millimeter, and Terahertz Waves (IRMMW-THz), Cancun, Mexico, 2017, pp. 1-2.

* cited by examiner

SUB-CARRIER MODULATED TERAHERTZ RADAR

BACKGROUND OF THE INVENTION

Field of the Invention

The present invention relates to a novel radar system that amplitude-modulates an output of a main-carrier signal of a semiconductor resonant tunneling diode (RTD) terahertz (THz) oscillator in a terahertz frequency band, which is in a range of about 0.1 [THz] to 10 [THz], by using a sub-carrier signal (about 2 [GHz] to 30 [GHz]) whose frequency varies periodically and linearly, and measures a distance to a target by using a signal processing to the sub-carrier signal and a demodulated signal. In accordance with the sub-carrier modulated terahertz radar of the present invention, the RTD oscillator enables to completely avoid an influence of re-entering of the reflected light, and features of the terahertz wave such as transparency are maintained because the main-carrier signal is the terahertz wave. Further, since the high frequency amplitude modulation of the output by the sub-carrier signal is simply achieved by direct-modulating an output of a direct current (DC) power supply, which is applied to the RTD, by using the sub-carrier signal (that is, by passing the output of the DC power supply through a bias-T circuit), the micro-size high-resolution terahertz radar enables to be constructed and to apply to a three-dimensional (3D) imaging system and so on.

Description of Related Art

In a terahertz radar system and a three-dimensional imaging system, an oscillation circuit including transistors and a frequency multiplier in combination with the oscillation circuit are used as a room temperature light source. However, in reality, the light source constituted by the oscillation circuit using only the transistors is difficult to design the circuit, and the frequency of the light source is limited to the sub-terahertz order whose highest frequency is a approximately 300 [GHz]. Although the resolution is improved in a case that the frequency of the terahertz wave is higher, in such a high frequency, the wave source which is combined with the oscillation circuit using the transistors and the frequency multiplier is needed, and there is a problem that the device becomes a large size.

A terahertz frequency band whose frequency is between that of a radio wave and that of an optical wave is an undeveloped frequency band. If the terahertz frequency device is put to practical use, it is desired to apply the terahertz frequency device to the various fields such as the radar system and the imaging system. In particular, since the terahertz wave has the features such as passing through the various materials, the applications such as the radar under environments with poor visibility and the transparent 3D imaging, which cannot be realized by the waves in other frequency bands, enable to be achieved.

In a case that the terahertz light source including the RTD is used in such the radar and the imaging, the unprecedented micro-size high-resolution system enables to be realized. The RTD has a simple single configuration including only the light source device and the DC power source, and is the terahertz wave source in which the high frequency wave (up to approximately 2 [THz]) which is used in the high-resolution radar and the imaging is generated at the room temperature. Other single room temperature semiconductor devices exist only the light source which generates the wave up to approximately 300 [GHz] and cannot generate such a high frequency wave.

THE LIST OF PRIOR ART DOCUMENTS

Patent Documents

Patent Document 1: Japanese Unexamined Patent Publication No. 2013-171966 A
Patent Document 2: Japanese Unexamined Patent Publication No. 2006-210585 A
Patent Document 3: WO 2015/170425 A1

Non-Patent Documents

Non-Patent Document 1: Cooper, K. B.; Dengler, R. J.; Llombart, N.; Thomas, B.; Chattopadhyay, G.; Siegel, P. S. "THz imaging radar for standoff personnel screening" IEEE Trans. Terahertz Sci. Technol. 2011, 1, 169-182.
Non-Patent Document 2: Caris, M.; Stanko, S.; Wahlen, A.; Sommer, R.; Wilcke, J.; Pohl, N.; Leuther, A.; Tessman, "'A. Very high resolution radar at 300 GHz" In Proceedings of the 44th European Microwave Conference, Rome, Italy, 6-9 Oct. 2014; pp. 1797-1799.
Non-Patent Document 3: Jaeschke, T.; Bredendiek, C.; Pohl, N. "A 240 GHz ultra-wideband FMCW radar system with on-chip antennas for high resolution radar imaging" In Proceedings of the 2013 IEEE MIT-S International Microwave Symposium Digest, Seattle, Wash., USA.
Non-Patent Document 4: R. Izumi, S. Suzuki, and M. Asada, International Conference on Infrared, Millimeter, and Terahertz Waves (IRMMW-THz), MA3.1, 2017.

SUMMARY OF THE INVENTION

However, when the output reflected at an outside of the RTD oscillator due to diffused reflection and so on is re-entered into the main-carrier RTD terahertz oscillator in the terahertz frequency band (about 0.1 [THz] to about 10 [THz]) of the semiconductor RTD terahertz oscillator, there is a problem in characteristics that the oscillation frequency is fluctuated. In order to construct the radar system in a normal method, large components such as an isolator are needed. Thus, in conventional, it is impossible to configure the micro-size RTD system in which the micro-size system is the important feature of the RTD terahertz oscillator.

The present invention has been developed in view of the above-described circumstances, and an object of the present invention is to provide the sub-carrier modulated terahertz radar that is a micro-size high-resolution radar, stabilizes the oscillation frequency of the RTD terahertz oscillator without fluctuating the oscillation frequency due to a disturbance wave or disturbance light, and enables to perform a radar operation in the terahertz frequency band even at a room temperature.

The present invention relates to a sub-carrier modulated terahertz radar, and the above-described object of the present invention is achieved by modulating a main-carrier signal in a terahertz frequency band, which is generated from a resonant tunneling diode (RTD), by a sub-carrier signal in a gigahertz frequency band whose frequency varies periodically, irradiating a frequency-modulated irradiation light to a target, detecting and demodulating a reflected light from the target, mixing a demodulated signal with the sub-carrier signal, performing a Fourier transform on a mixed signal, and measuring a distance from an irradiation position to the target by using a Fourier-transformed frequency signal.

Further, the present invention relates to a sub-carrier modulated terahertz radar, and the above-described object of the present invention is achieved by comprising: a resonant tunneling diode (RTD) transmitter to oscillate a main-carrier signal in a terahertz frequency band from a resonant tunneling diode (RTD) to which a bias is applied through a bias-T circuit and irradiate the main-carrier signal to a target; a sub-carrier oscillator to oscillate a sub-carrier signal in a gigahertz frequency band whose frequency varies periodically and apply the sub-carrier signal to the bias-T circuit; a detector to detect and demodulate a reflected light from the target; a mixer to mix a demodulated signal from the detector with the sub-carrier signal and output an intermediate frequency signal; and a distance calculating section to calculate a distance between the RTD transmitter and the target by using a frequency signal obtained by performing a Fourier transform on the intermediate frequency signal, or by comprising: a resonant tunneling diode (RTD) transmitter to oscillate a main-carrier signal in a terahertz frequency band from a resonant tunneling diode (RTD) to which a bias is applied through a bias-T circuit and irradiate the main-carrier signal to a target; a sub-carrier oscillator to oscillate a sub-carrier signal in a gigahertz frequency band whose frequency varies periodically and apply the sub-carrier signal to the bias-T circuit; a detector to detect and demodulate a reflected light from the target; a phase shifting section to shift a phase of the sub-carrier signal and output first and second sub-carrier signals in which the first sub-carrier signal has a 90 degree phase difference with the second sub-carrier signal; a first mixer to mix a demodulated signal from the detector with the first sub-carrier signal and output a first intermediate frequency signal; a second mixer to mix a demodulated signal from the detector with the second sub-carrier signal and output a second intermediate frequency signal; and a distance calculating section to calculate a distance between the RTD transmitter and the target by using the first and second intermediate frequency signals.

DETAILED DESCRIPTION OF THE PREFERRED EMBODIMENTS

Waves in a terahertz frequency band (about 0.1 [THz] to about 10 [THz]) have features such as passing through various materials, and it is desired to apply the terahertz waves to various fields such as a radar system under environments with poor visibility and a transparent 3D imaging system. Since an RTD terahertz oscillator which is used in embodiments of the present invention is a single oscillator and generates the wideband terahertz waves by only connecting to a DC power supply (by only adding a bias), a micro-size high-resolution system enables to be realized. However, because oscillation characteristics are varied when an irradiated light is re-entered into the RTD terahertz oscillator due to diffused reflection and so on, there is a problem that a conventional radar technique in which characteristics of a reflected wave are directly used is not applied to the RTD terahertz oscillator.

In this connection, an object of the present invention is to avoid the problem that the reflected wave is re-entered into the RTD terahertz oscillator and realize the micro-size high-resolution radar system. If such a radar system is realized, the micro-size high-resolution radar system is easily applied to the transparent 3D imaging system.

If the radar system does not directly signal-process the terahertz wave, but uses a gigahertz order sub-carrier signal with which a terahertz order main-carrier signal is convoluted, even in a case that the characteristics of the terahertz wave are varied by re-entering the reflected wave into the RTD, the characteristic variations of the terahertz wave are not badly affected because the signal processing for measuring a distance is performed in only the sub-carrier signal. Since the main-carrier signal is the terahertz wave, the features of the terahertz wave such as transmission are maintained. Even when the higher frequency wave is needed for the sub-carrier signal, the main-carrier signal from the RTD enables to directly be modulated by the higher frequency sub-carrier signal and the characteristic variations of the terahertz wave are not adversely affected.

Embodiments of the present invention will be described with reference to the accompanying drawings as follows.

Figure 1:
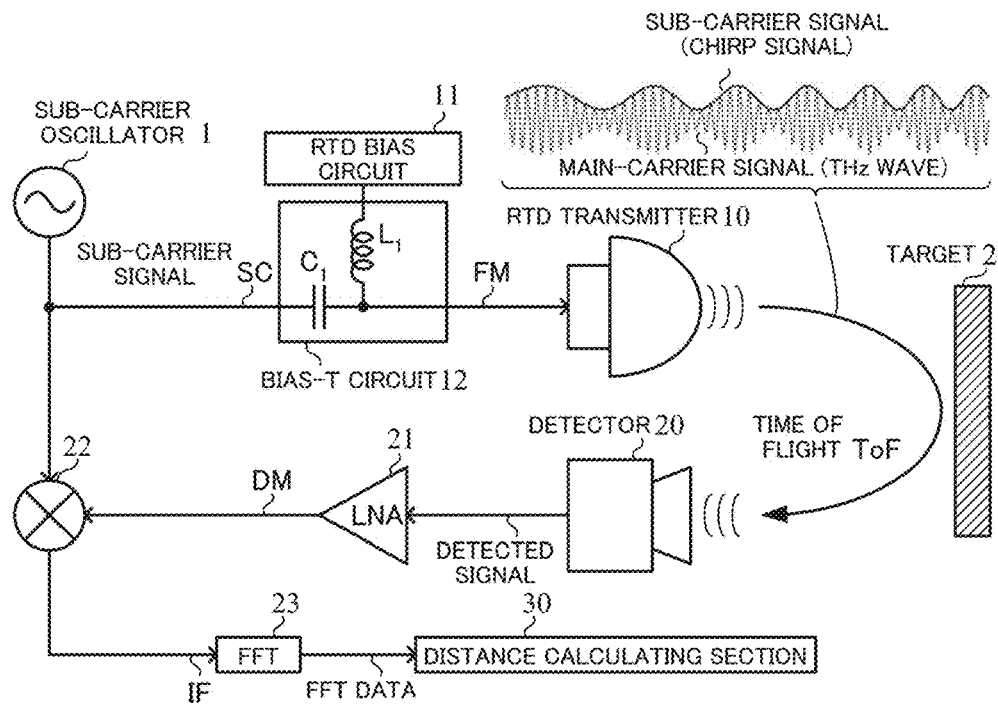
FIG. 1 is a schematic diagram showing a configuration example of the first embodiment according to the present invention.
Figure 2:
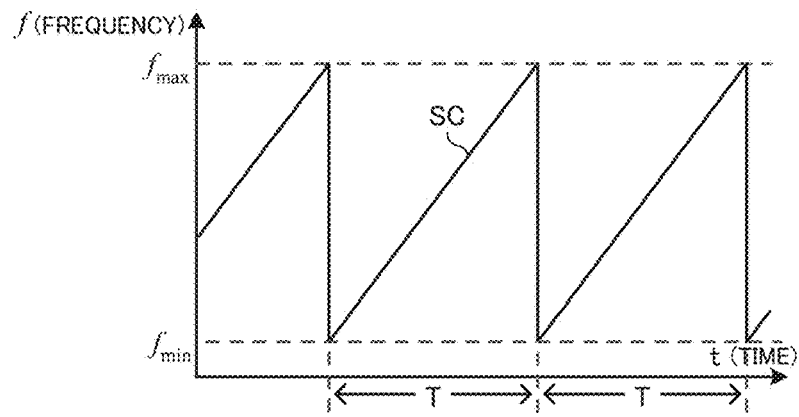
FIG. 2 is a characteristic diagram showing one example of a sub-carrier signal.
Figure 3:
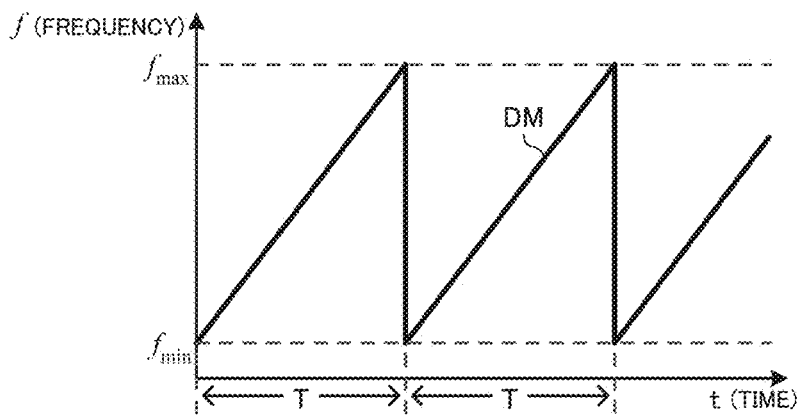
FIG. 3 is a characteristic diagram showing one example of a demodulated signal.

FIG. 1 shows a configuration of the first embodiment according to the present invention. A resonant tunnel diode (RTD) transmitter 10 constituted by an semiconductor RTD is driven by a DC power supply of an RTD bias circuit 11 through a bias-T circuit 12 including a capacitor $C_1$ and an inductor $L_1$, oscillates a main-carrier signal of the terahertz wave, and irradiates the main-carrier signal to a target 2. The DC power supply of the RTD bias circuit 11 is applied to the RTD transmitter 10 through the inductor $L_1$ of the bias-T circuit 12. The sub-carrier signal SC whose frequency varies with a sawtooth characteristic with a period T as shown in FIG. 2 is inputted from a sub-carrier oscillator 1 to the capacitor $C_1$ in the bias-T circuit 12, a modulated signal FM which is added with a signal from the capacitor $C_1$ and the bias is inputted into the RTD transmitter 10, and the main-carrier signal which is oscillated by the RID transmitter 10 is frequency-modulated by the modulated signal FM. As shown in FIG. 2, since the sub-carrier signal SC is a sawtooth wave in which the frequency is linearly varied with each period T, and is applied to the RTD transmitter 10 through the capacitor $C_1$ in the bias-T circuit 12, the terahertz output wave from the RTD transmitter 10 is amplitude-modulated by the modulated signal FM. The amplitude-modulated terahertz output wave is irradiated to the target 2 and is reflected on the target 2, and the reflected wave is detected and is demodulated by a detector 20. A time of flight (propagation time) from the irradiation to the detection is represented by "ToF". The signal which is detected and is demodulated by the detector 20 is amplified by a low noise amplifier (LNA) 21, and the amplified signal is inputted into a mixer 22 as a demodulated signal DM as shown in FIG. 3.

Figure 4:
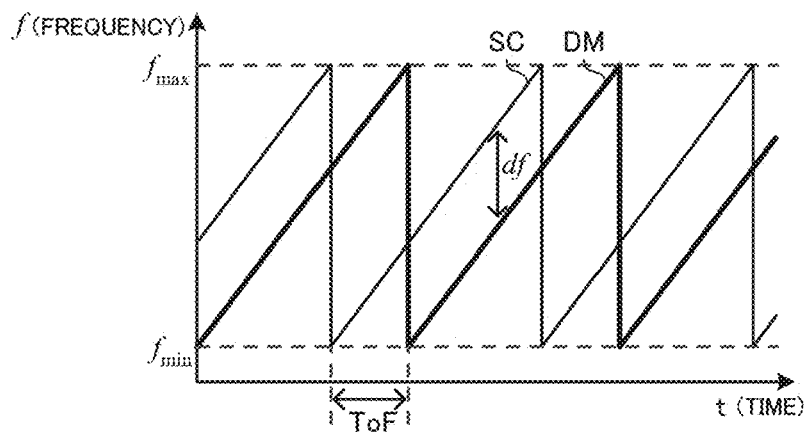
FIG. 4 is a characteristic diagram for explaining a mixing operation in the first embodiment.

The sub-carrier signal SC from the sub-carrier oscillator 1 is also inputted into the mixer 22 as a reference signal. The sub-carrier signal SC and the demodulated signal DM, which have a relationship as shown in FIG. 4, are inputted into the mixer 22. That is, the demodulated signal DM which is delayed with respect to the sub-carrier signal SC by the time of flight ToF is inputted into the mixer 22. A frequency difference df which is determined by the time of flight ToF is always existed between the sub-carrier signal SC and the demodulated signal DM. An intermediate frequency signal IF which is mixed in the mixer 22 is inputted into a Fourier transform section 23, and the Fourier transform section 23 performs fast Fourier transform (FFT) on the intermediate frequency signal IF and calculates a frequency component of the intermediate frequency signal IF. The FFT data of the frequency component obtained by performing the FFT on the intermediate frequency signal IF are inputted into a distance calculating section 30, and a distance to the target 2 is calculated by using the following expressions.

Gradients of the sub-carrier signal SC and the demodulated signal DM are the same value "a" and are calculated by the following Expression 1 using the highest frequency $f_{max}$, the lowest frequency $f_{min}$ and the period T.

$$a=(f_{max}-f_{min})/T \quad \text{[Expression 1]}$$

The distance of flight "s" is calculated by the following Expression 2 using the light speed c, the frequency difference df and the gradient "a".

$$s = \frac{df \times c}{a} \quad \text{[Expression 2]}$$

Assuming that a position of the RTD transmitter 10 is substantially the same as that of the detector 20, since the terahertz wave is reciprocated from the RTD transmitter 10 to the detector 20, the distance from the RTD transmitter 10 to the target 2 is calculated by the following Expression 3.

$$ds=s/2 \quad \text{[Expression 3]}$$

Figure 5:
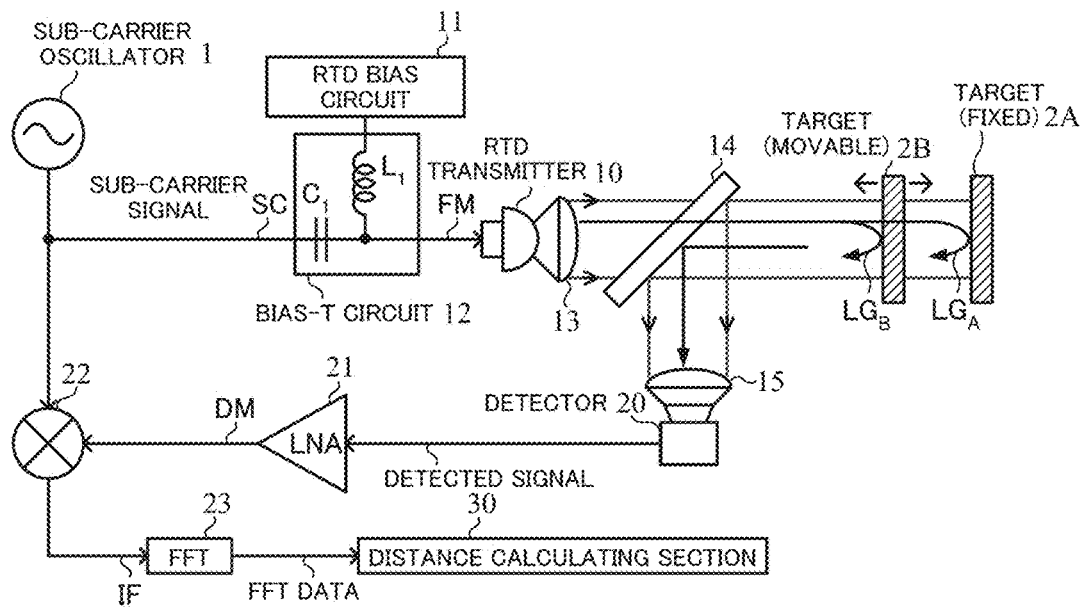
FIG. 5 is a schematic diagram showing a configuration example of the second embodiment according to the present invention.

FIG. 5 shows the second embodiment according to the present invention, in corresponding with FIG. 1. In the second embodiment, the two targets, a fixed target 2A and a movable target 2B which is disposed on a stage including a motor, are existed. As an example of the targets 2A and 2B, a front surface and a back surface of a plastic container or a paper container in which a part of the terahertz wave is penetrated and the rest is partially reflected, are corresponding to the targets 2A and 2B, respectively. A collimator lens 13 is disposed at a front surface of the RTD transmitter 10, the irradiated light becomes a collimated light, the collimated light is irradiated to a beam splitter 14, and the collimated light which is transmitted through the beam splitter 14 is irradiated to the target (movable) 2B. A part of the irradiated light is reflected on the target 2B, the rest of the irradiated light is transmitted, and the transmitted light is irradiated to the target (fixed) 2A. The reflected light $LG_A$, which is reflected on the target 2A, is transmitted through the target 2B and is reflected on the beam splitter 14. The reflection wave $LG_B$, which is reflected on the target 2B, is also reflected on the beam splitter 14. Both the reflected light $LG_A$ and the reflected light $LG_B$ are inputted into the detector 20 through the collective lens 15 and then are detected by the detector 20. The detected signals detected by the detector 20 are amplified in the low noise amplifier 21 and are inputted into the mixer 22. The sub-carrier signal SC is also inputted into the mixer 22.

Figure 6:
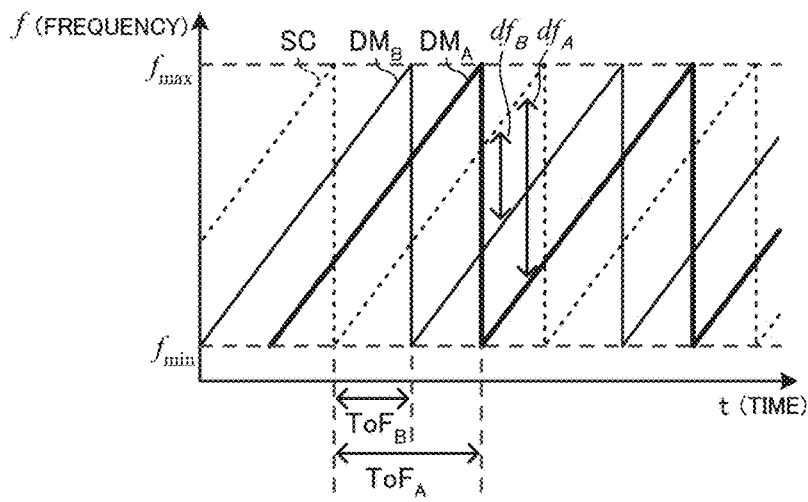
FIG. 6 is a characteristic diagram for explaining a mixing operation in the second embodiment.

As shown in FIG. 6, the demodulated signal $DM_A$ from the target 2A has a delay $ToF_A$ with respect to the sub-carrier signal SC until the demodulated signal $DM_A$ arrives at the detector 20, and the demodulated signal $DM_B$ from the target 2B has a delay $ToF_B$ with respect to the sub-carrier signal SC until the demodulated signal $DM_B$ arrives at the detector 20. Further, the demodulated signal $DM_A$ has the frequency difference $df_A$ and the demodulated signal $DM_B$ has the frequency difference $df_B$. The intermediate frequency signal IF from the mixer 22 is inputted into the Fourier transform section 23, the Fourier transform section 23 performs the FFT on the intermediate frequency signal IF, and the distance to the target 2A and the distance to the target 2B are calculated in the distance calculating section 30, as well as the above first embodiment.

Figure 7:
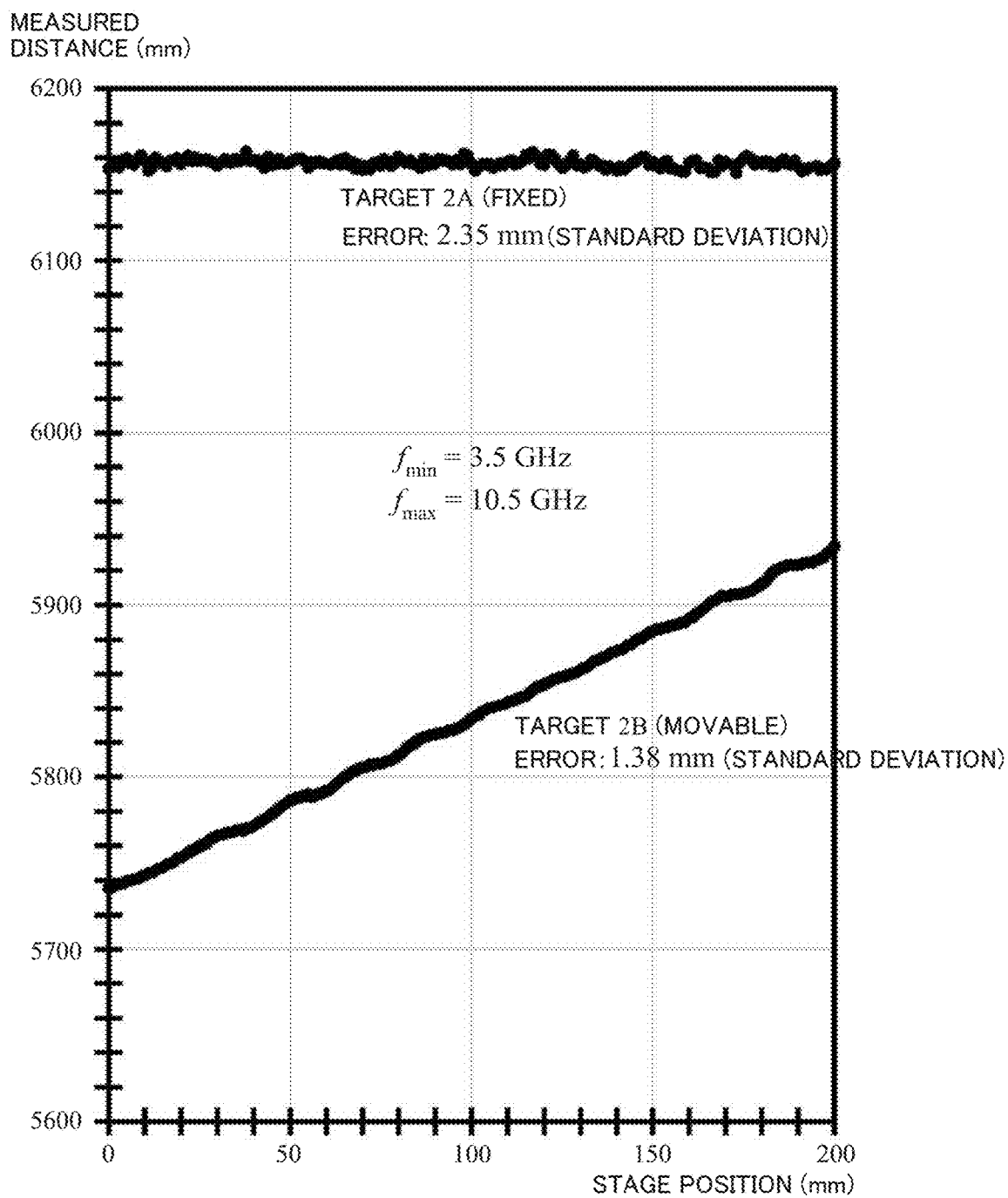
FIG. 7 is a characteristic diagram showing measured results of the second embodiment according to the present invention.

FIG. 7 shows actual measured results in a case that the frequency of the sub-carrier signal SC is varied under the condition that the highest frequency fmax of the sub-carrier signal SC is 10.5 [GHz], the lowest frequency fmin of the sub-carrier signal SC is 3.5 [GHz] and the period T is 2 [μsec]. The distance to the fixed target 2A is measured with an error 2.35 [mm] and the distance to the movable target 2B is measured with an error 1.38 [mm]. The reason why the distance to the stage position and the measured distance are different is that the time in which the sub-carrier signal SC from the sub-carrier oscillator 1 directly arrives at the mixer 22 is different from the time in which the sub-carrier signal SC from the sub-carrier oscillator 1 is inputted into the RTD transmitter 10 and the irradiation light from the RTD transmitter 10 arrives at the mixer 22 through the targets 2A and 2B, the beam splitter 14 and the detector 20, and the measured distance is calculated considering the difference of the above times.

Since a slight fluctuation due to a noise is included in the straight-line-shape measured results, the distance is calculated by averaging the measured results and the error is derived from the standard deviation. In the target 2A, the error (standard deviation) is 2.35 [mm] and in the target 2B, the error (standard deviation) is 1.38 [mm].

Figure 8:
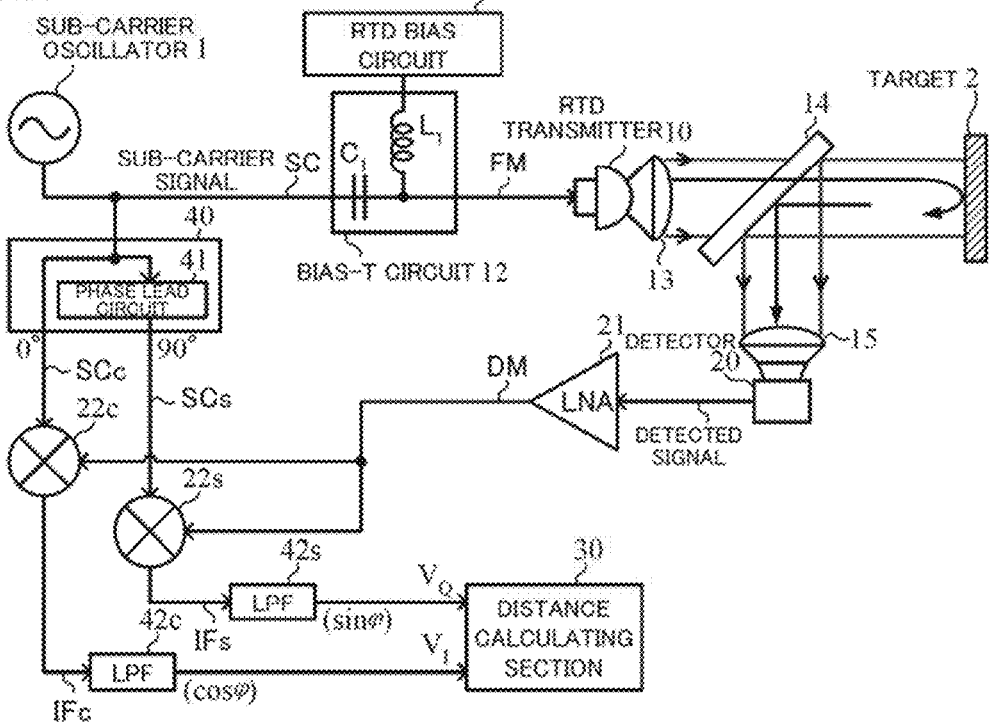
FIG. 8 is a schematic diagram showing a configuration example of the third embodiment according to the present invention.

Next, the third embodiment shown in FIG. 8 will be described. In the third embodiment, the radar system includes a phase shifting section 40 to phase-shift the sub-carrier signal SC and output the two sub-carrier signals SCc (cos) and SCs (sin) in which the sub-carrier signal SCc has a 90 degree phase difference with the sub-carrier signal SCs. In FIG. 8, the sub-carrier signal SC passes through a phase lead circuit 41, resulting in generating the sub-carrier signal SCs. Thus, the phase shifting section 40 outputs the two sub-carrier signals SCc (cos) and SCs (sin) in which the sub-carrier signal SCc has a 90 degree phase difference with the sub-carrier signal SCs. The 0-degree sub-carrier signal SCc is inputted into the mixer 22c and the 90-degree sub-carrier signal SCs is inputted into the mixer 22s. The demodulated signal DM from the low noise amplifier 21 is inputted into the mixers 22c and 22s and the intermediate frequency signal IFc from the mixer 22c and the intermediate frequency signal IFs from the mixer 22s are inputted into the distance calculating section 30 through a low pass filter (LPF) 42c and a low pass filter (LPF) 42s for removing the noise, respectively. The intermediate frequency signal $V_I$ from the LPF 42c and the intermediate frequency signal $V_Q$ from the LPF 42s are represented by the following Expression 4.

$$V_I = A \cdot \cos(2\pi f(t_{meas} - t_{ref})) = A \cdot \cos \varphi$$

$$V_Q = A \cdot \sin(2\pi f(t_{meas} - t_{ref})) = A \cdot \sin \varphi \text{[Expression 4]}$$

Here, "A" is a constant, "$t_{meas}$" is the time of flight from the time when the sub-carrier signal oscillator 1 oscillates the sub-carrier signal SC to the time when the detected reflected light arrives at the mixers 22c and 22s through the RTD transmitter 10 and the target 2, "$t_{ref}$" is the time of flight from the time when the sub-carrier signal oscillator 1 oscillates the sub-carrier signal SC to the time when the sub-carrier signals SCc and SCs respectively arrive at the mixers 22c and 22s, and "f" is a frequency of the sub-carrier signal SC.

Since the following Expression 5 is satisfied by the above Expression 4, the following Expression 6 is obtained.

$$\frac{V_Q}{V_I} = \frac{\sin\varphi}{\cos\varphi} = \tan\varphi \qquad \text{[Expression 5]}$$

$$\varphi = \tan^{-1}\frac{V_Q}{V_I} \qquad \text{[Expression 6]}$$

Since "φ" in the above Expression 4 is represented by the following Expression 7, the difference between the time of flight "$t_{meas}$" and the time of flight "$t_{ref}$" is obtained and the measured distance ds can be calculated by using the following Expressions 7 and 8. Here, the RTD transmitter 10, the beam splitter 14 and the detector 20 are arranged so that the distance between the RTD transmitter and the beam splitter 14 is the same as the distance between the detector 20 and the beam splitter 14.

$$\varphi = 2\pi f(t_{meas} - t_{ref}) \qquad \text{[Expression 7]}$$

$$ds = \frac{c}{4\pi} \cdot \frac{\varphi}{f} = \frac{c}{2}(t_{meas} - t_{ref}) \qquad \text{[Expression 8]}$$

Figure 9:
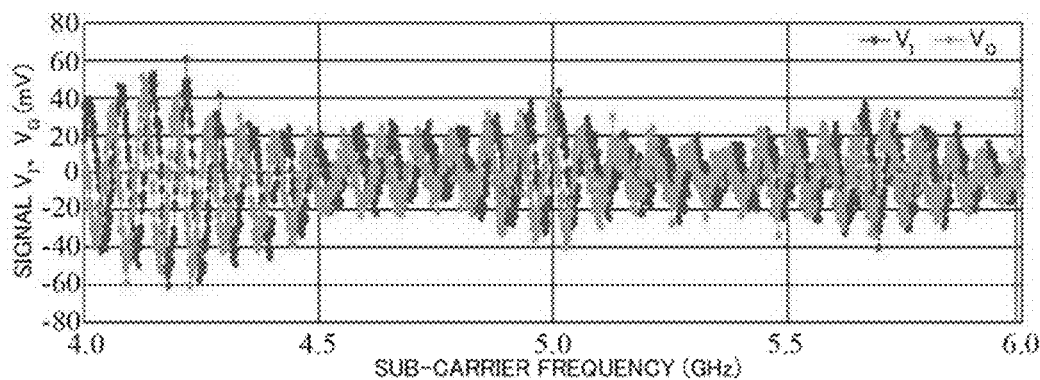
FIG. 9 is a frequency characteristic diagram showing an operation example of the third embodiment.
Figure 10:
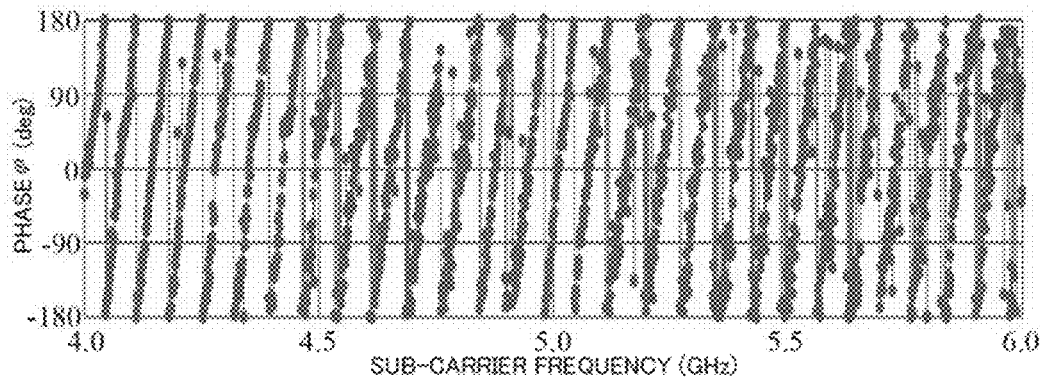
FIG. 10 is a phase characteristic diagram showing the operation example of the third embodiment.
Figure 11:
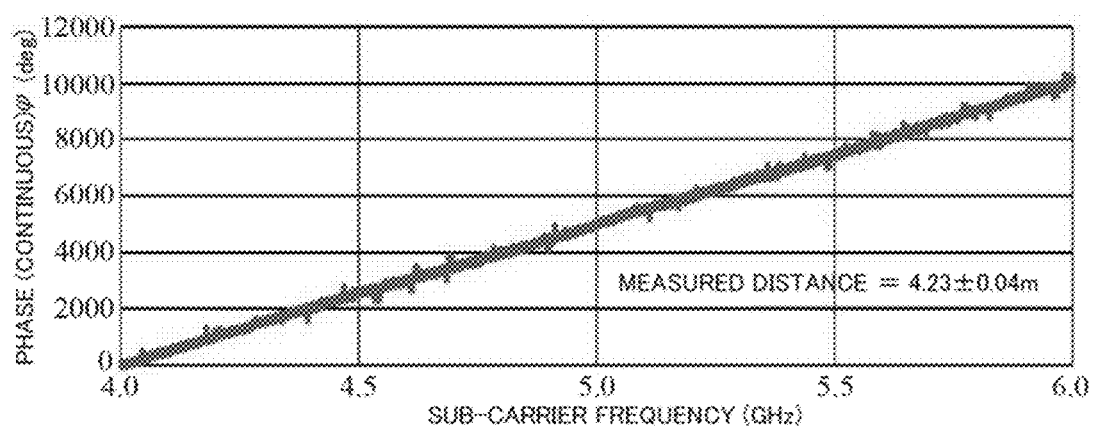
FIG. 11 is a schematic diagram showing a relationship of FIG. 10.

FIG. 9 shows measured results of the signal levels of the intermediate frequency signals $V_I$ and $V_Q$ according to the third embodiment when the frequency f of the sub-carrier signal SC is varied, and FIG. 10 shows a result of the phase "φ" to the frequency f of the sub-carrier signal SC. FIG. 11 is a graph in which the result of FIG. 10 is continuously shown as a total phase. In FIG. 11, the phase "φ" is linearly varied with respect to the frequency f, in coincident with the Expression 7, the phase $\tan^{-1}(V_Q/V_I)$ is accurately obtained from the intermediate frequency signals $V_I$ and $V_Q$, and the distance ds is obtained from this result based on the Expression 8.

Since the time in which the sub-carrier signal SC from the sub-carrier oscillator 1 directly arrives at the mixers 22c and 22s is different from the time in which the sub-carrier signal SC from the sub-carrier oscillator 1 is inputted into the RTD transmitter 10 and the irradiation light from the RTD transmitter 10 arrives at the mixers 22c and 22s through the target 2, the beam splitter 14 and the detector 20, the measured distance is calculated considering the difference of the above times.

In the first to third embodiments, the low power RTD oscillator (approximate 10 µW) is used. Since the error is to be in inverse proportion to the output power, the error becomes smaller when the high power RTD oscillator is used. The 500 GHz terahertz wave is used in the first to third embodiments and the RTD transmitter whose frequency is up to 2 [THz] also enables to be used in the first to third embodiments.

In the conventional radar constituted by the light source including the transistor oscillator, the oscillation frequency is limited to the sub-terahertz order such as 300 [GHz]. If the oscillation frequency becomes higher, the resolution is improved, but the light source in which the transistor oscillator is combined with the frequency multiplier is needed in the higher frequency. Consequently, there is a problem that the overall device becomes larger. In accordance with the sub-carrier modulated terahertz radar of the present invention, the oscillation frequency by the micro-size RTD oscillator is oscillated up to approximately 2 [THz], the single configuration including the light source device enables to be used, the simple micro-size high-resolution terahertz radar is realized, and the applications such as the 3D imaging and the radar under the environments with the poor visibility due to fog, dust or the like enables to be achieved.

The invention claimed is:

1. A sub-carrier modulated terahertz radar that modulates a main-carrier signal in a terahertz frequency band, which is generated from a resonant tunneling diode (RTD), by a sub-carrier signal in a gigahertz frequency band whose frequency varies periodically, irradiates a frequency-modulated irradiation light to a target, detects and demodulates a reflected light from said target, mixes a demodulated signal with said sub-carrier signal, performs a Fourier transform on a mixed signal, and measures a distance from an irradiation position to said target by using a Fourier-transformed frequency signal.

2. The sub-carrier modulated terahertz radar according to claim 1, wherein said terahertz frequency band is in a range of 0.1 [THz] to 10 [THz] and said gigahertz frequency band is in a range of 2 [GHz] to 30 [GHz].

3. The sub-carrier modulated terahertz radar according to claim 1, wherein oscillation of said main-carrier signal by said RTD and modulation by said sub-carrier signal are performed in a bias-T circuit.

4. A sub-carrier modulated terahertz radar, comprising:
   a resonant tunneling diode (RTD) transmitter to oscillate a main-carrier signal in a terahertz frequency band from a resonant tunneling diode to which a bias is applied through a bias-T circuit and irradiate said main-carrier signal to a target;
   a sub-carrier oscillator to oscillate a sub-carrier signal in a gigahertz frequency band whose frequency varies periodically and apply said sub-carrier signal to said bias-T circuit;
   a detector to detect and demodulate a reflected light from said target;
   a mixer to mix a demodulated signal from said detector with said sub-carrier signal and output an intermediate frequency signal; and
   a distance calculating section to calculate a distance between said RTD transmitter and said target by using a frequency signal obtained by performing a Fourier transform on said intermediate frequency signal.

5. The sub-carrier modulated terahertz radar according to claim 4, wherein an oscillation frequency of said sub-carrier signal is linearly varied in one period of said sub-carrier signal.

6. The sub-carrier modulated terahertz radar according to claim 4, wherein a beam splitter is disposed between said RTD transmitter and said target, and
wherein an irradiated light from said RTD transmitter is transmitted through said beam splitter and is irradiated to said target, and said reflected light from said target is reflected on said beam splitter and is inputted into said detector.

7. The sub-carrier modulated terahertz radar according to claim 6, wherein said irradiated light from said RTD transmitter is collimated through a collimated lens and a collimated light is irradiated to said beam splitter, and
wherein a reflected light reflected on said beam splitter is inputted into said detector through a collective lens.

8. A sub-carrier modulated terahertz radar, comprising:
a resonant tunneling diode (RTD) transmitter to oscillate a main-carrier signal in a terahertz frequency band from an RTD to which a bias is applied through a bias-T circuit and irradiate said main-carrier signal to a target;
a sub-carrier oscillator to oscillate a sub-carrier signal in a gigahertz frequency band whose frequency varies periodically and apply said sub-carrier signal to said bias-T circuit;
a detector to detect and demodulate a reflected light from said target;
a phase shifting section to shift a phase of said sub-carrier signal and output first and second sub-carrier signals in which said first sub-carrier signal has a 90 degree phase difference with said second sub-carrier signal;
a first mixer to mix a demodulated signal from said detector with said first sub-carrier signal and output a first intermediate frequency signal;
a second mixer to mix a demodulated signal from said detector with said second sub-carrier signal and output a second intermediate frequency signal; and
a distance calculating section to calculate a distance between said RTD transmitter and said target by using said first and second intermediate frequency signals.

9. The sub-carrier modulated terahertz radar according to claim 8, wherein an oscillation frequency of said sub-carrier signal is linearly varied in each period of said sub-carrier signal.

10. The sub-carrier modulated terahertz radar according to claim 8, wherein a beam splitter is disposed between said RTD transmitter and said target, and
wherein an irradiated light from said RTD transmitter is transmitted through said beam splitter and is irradiated to said target, and said reflected light from said target is reflected on said beam splitter and is inputted into said detector.

11. The sub-carrier modulated terahertz radar according to claim 10, wherein said irradiated light from said RTD transmitter is collimated through a collimated lens and a collimated light is irradiated to said beam splitter, and
wherein a reflected light reflected on said beam splitter is inputted into said detector through a collective lens.

* * * * *